United States Patent Office  3,019,179
Patented Jan. 30, 1962

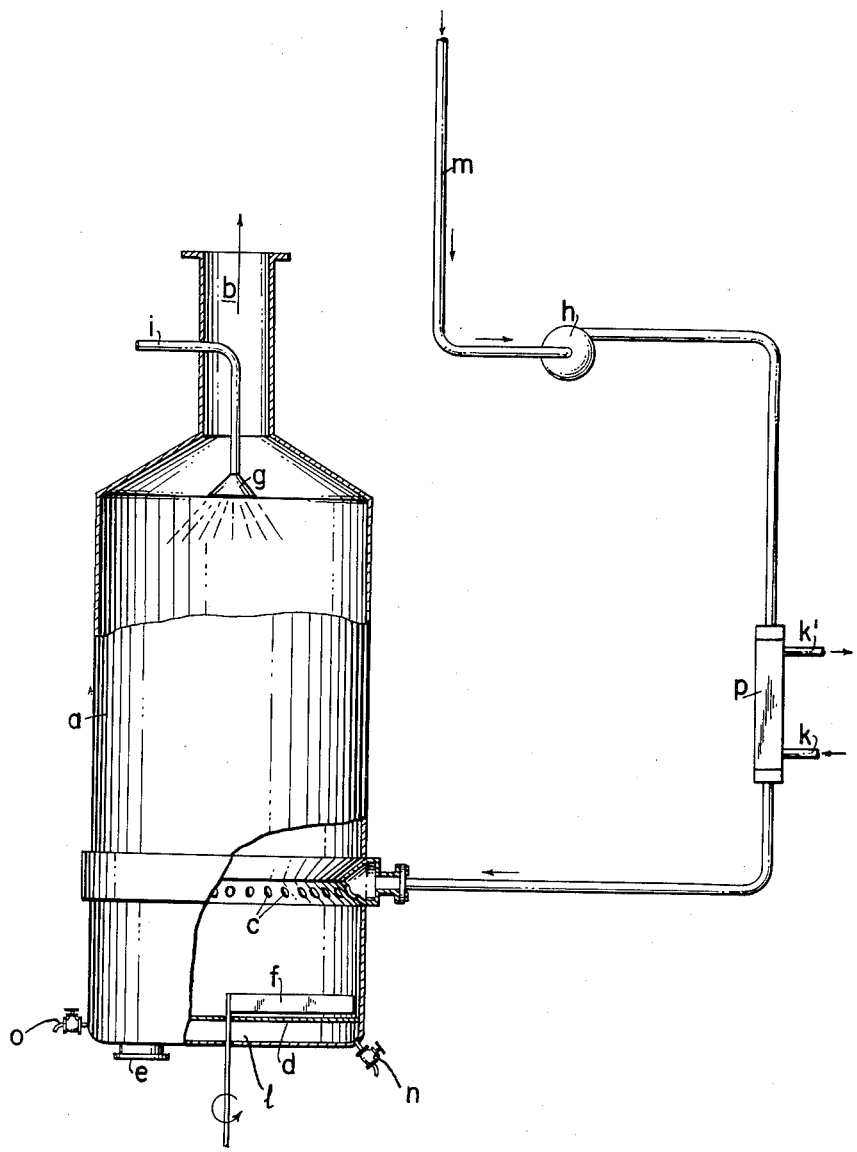

3,019,179
PROCESS OF SEPARATING WAX FROM WAX- AND OIL-CONTAINING MATERIALS
Alfred Hoppe, Hans Langner, and Heinrich Westerhoff, Frankfurt am Main, Herbert Wolke, Holstein, and Gunther Hauenstein, Hanau (Main), Germany, assignors to Edeleanu Gesellschaft m.b.H., Frankfurt am Main, Germany, a body corporate of Germany
Filed Sept. 15, 1953, Ser. No. 380,206
Claims priority, application Germany Sept. 15, 1952
4 Claims. (Cl. 208—33)

The present invention relates to a process and apparatus for separating wax from wax- and oil-containing materials. A special object of the invention consists in separating paraffin wax from wax-containing hydrocarbon oils. Further objects of the invention are, to obtain hard wax and soft wax separately from each other; to split up crude paraffin wax into wax fractions of different melting points, and more especially, to provide a special treatment of wax-containing oil or crude oil-containing wax in order to obtain oil of low pour point, on the one hand, and practically oil-free wax, on the other.

In order to separate paraffin wax from wax-containing hydrocarbon oils it is usual to cool the oil to be dewaxed, if desired, after the addition of a solvent, to the desired temperature, and to separate the precipitated wax by filtration. In this process experience has shown that the wax is obtained in an easily filterable form from the oil or from the oil-solvent mixture only by gradually cooling the material. The optimum speed of cooling is generally attained by cooling the wax-containing oil at the rate of about 1–2 degrees centigrade per minute. On the other hand, by rapid cooling, that is to say, by "shock cooling," there is obtained a product difficult to filter off.

The present invention is based on the observation that the aforesaid disadvantage of shock cooling is avoided if the shock cooling is carried out in a certain manner and the cooled mass so obtained is worked up in a suitable manner.

Accordingly, this invention provides a process for separating paraffin wax from mixtures of wax and oil, advantageously from wax-containing hydrocarbon oils, which comprises spraying a liquid oil-wax mixture in a finely divided state, for example, through a nozzle or nozzles, into a stream of air having a temperature at least 10° C. below the pour point of the mixture and flowing in counter-current to the finely divided particles of the sprayed mixture, whereby a granular mass is obtained, subsequently mixing and stirring the granular mass at a temperature below the melting point of the wax to be separated with a de-waxing solvent and separating the wax from the oil solution, for example, by filtration. In this process the paraffin wax-containing oil is unexpectedly deposited in the form of a granular mass. The granular mass is treated or stirred, that is to say, digested, with a solvent or mixture of solvents, whereby the portions remaining liquid pass into solution. In stirring the mass a temperature should be used lying under the melting temperature of the wax to be separated. The solid wax is separated from the solution by filtration.

The temperature of the air is at least 10 degrees centigrade below the temperature of the oil to be sprayed. It may vary within relatively wide limits, and in general lies between the melting point of the wax and the digestion temperature. It is, however, possible, depending on the nature of the oil to be treated, to maintain the temperature of the air lower than that of the solvent used for the digestion or vice versa.

The temperature of the wax-containing oil to be sprayed is advantageously only slightly above the pour point of the oil. Fine subdivision of the oil in the air is ensured when the viscosity of the oil in the liquid state before the spraying operation is at most about 2° Engler. Thus, for example, if a wax-containing oil having a viscosity of 2° Engler or lower is sprayed into air through a nozzle, a dry granular mass is deposited which can be easily removed from the floor of the vessel in which it is sprayed and the further working up is facilitated. If, however, the mixture to be dewaxed has a higher viscosity, there is obtained a flowable mass which is homogeneously solid after being cooled below its melting point. Such a mass is difficult to remove from the floor of the vessel and, after the addition of a solvent, cannot be worked up successfully. The oil content of the wax final product is higher. The reason for this is that it is not possible to bring about an adequate separation of the liquid oily constituents from the solid wax by dissolution in a solvent.

The viscosity of a hydrocarbon oil can be adjusted by changing the temperature to the desired extent. In order to obtain a viscosity of 2° Engler in the case of a heavy oil, the oil is heated to the necessary temperature. Oils of low viscosity possess the desired viscosity of about 2° Engler at temperatures only slightly above their pour point, but oils of high viscosity must be heated to a temperature of 70° C. or higher. These higher oil temperatures are disadvantageous in the present process.

In order to enable oils of higher viscosity to be sprayed by the present process, the spraying is carried out with a gas which mixes with the oil so as to lower its viscosity. Spraying is advantageously carried out by means of an auxiliary gas with the aid of air compressors, ejectors or the like, for example, with the known spraying guns.

It will be understood that spraying with the aid of an auxiliary gas may also be used in the case of oils of lower viscosity.

As mentioned above, the sprayed mass is subsequently mixed and stirred with a solvent. As such solvents there are used those which are known as dewaxing solvents, for example, propane, halogenated hydrocarbons such as dichlorethene, a mixture of dichlorethane and methylene chloride, a mixture of benzene and acetone or the like. The digestion is carried out with a quantity of solvent such that an easily filterable mixture is obtained. If the material has a low content of oil it is treated, for example, with 100–300 percent by volume of solvent, and at higher contents of oil or in the case of viscous oils dilutions up to 1000 percent by volume are advantageous.

It is important that the sprayed mass should be stirred with the solvent until the constituents which are to be obtained as filtrate in the following filtration process have passed completely or substantially complete into solution. In this connection the temperatures maintained during the digestion plays an important part. If it is desired to separate hard wax of high melting point, the stirring is carried out at about +30 to +50° C., whereby the oil and soft wax pass into solution and a filtrate oil of high pour point is obtained. The lower the temperature during the digestion, the greater the quantity of soft wax that remains undissolved and becomes associated with the hard wax, thereby lowering the melting point of the wax. On the other hand the pour point of the filtrate oil is improved. If the stirring is carried out at a low temperature, for example, at −20° C., the whole of the wax is obtained as filter cake with a filtrate oil of low pour point.

In order to dewax a wax and oil-containing material, that is to say, in order to split a wax-containing oil or an oil-containing crude wax into wax free from oil and a filtrate oil of a low pour point, the mixture is sprayed into the stream of air, and the granular mass obtained is mixed at a low temperature, for example at −20° C. with a relatively large amount of solvent, for example 700 percent by volume, and the mixture is stirred for 5–60 minutes and then filtered.

In order to economise the solvent it is of advantage to carry out the digestion of the sprayed mass with the filtrate resulting from a previous filtration to recover the wax.

Advantages of the process of this invention as compared with the known solvent or pressing process are that a costly heat exchanger is dispensed with and considerable quantities of solvents are saved.

A distillate or raffinate may be dewaxed and a crude wax may be split up into hard wax, soft wax and oil by the following two methods:

(1) The sprayed mass is stirred at a low temperature with a solvent and the wax proper is separated from the oil. The wax proper is again sprayed, if desired, after removing the solvent, and the resulting mass is then digested at a higher temperature with a solvent, whereby the soft wax is dissolved. The solid hard wax is then separated by filtration and freed from solvent by washing.

(2) The starting material is sprayed, the mass is digested at a relatively high temperature with a solvent, whereby the oil and the soft wax are dissolved. The hard wax is separated from the mixture by filtration. The filtrate is then sprayed again, if desired, after removed the solvent, at a temperature at which the soft wax solidifies. The mass is then digested at a correspondingly lower temperature, whereby the soft wax is obtained in solid form and can be separated from the oil-solvent mixture by filtration.

By these two methods any crude wax can be fractionated. Depending on the digestion temperature used there are obtained waxes having different melting points. The less the temperature at which the sprayed mass is again mixed and digested with solvent differs from that used in the preceding stage, the less do the melting points of the wax fractions so obtained differ from one another, and the more frequently this process is repeated and the greater the number of fractions that can be obtained.

In order to attain especially high grade wax the de-oiled wax may be treated repeatedly in accordance with the invention, that is to say, the separate steps of spraying, digesting, separating and washing can be repeated as often as desired. However, it is not necessary to repeat the spraying operation a corresponding number of times, since in many cases it suffices to spray the product only once and then to carry out the digestion, separation and washing as often as is desired.

Generally, a two-stage treatment suffices which involves spraying only once, and digesting twice, the separated wax being well washed.

The invention also includes apparatus for carrying out the process described above, which comprises a tower the upper part of which narrows to form a chimney, nozzle means in the upper part of the tower for spraying the oil-wax mixture into air within the tower, air inlets in the lower part of the tower around the periphery thereof for introducing air into the tower in countercurrent to the finely divided particles of the sprayed oil-wax mixture, and a floor at the base of the tower for collecting the deposited granular mixture, said floor having a discharge opening therein for the said mixture. There may also be provided scraping means for removing the mixture deposited on the floor and/or means for cooling the floor to below ambient temperature.

An example of apparatus for carrying out the process of the invention is shown diagrammatically in the accompanying drawing.

The spraying of the wax-containing oil is carried out in a tower-like vessel $a$. The upper part of the tower $a$ is narrowed to form a chimney $b$. In the lower part of the tower there are provided around its entire circumference openings $c$ for introducing the air. The bottom of the tower is constructed in the form of a plate $d$ capable of being cooled by means of a cooling jacket $l$ through which a cooling medium can be passed from an inlet $n$ to an outlet $o$. The wax-containing oil is supplied through the conduit $i$ to the nozzle $g$, by means of which the oil is converted into spray. The tower $a$ may contain a plurality of such nozzles.

The mass obtained as the result of spraying the wax-containing oil is discharged through an opening $e$ in the bottom of the tower. A scraper $f$ assists the discharge of the mass. The mass is then mixed with solvent in known apparatus (not shown).

The process is carried out with the use of air which is sucked through a conduit $m$ by means of a blower $h$, and forced by way of a cooling device $p$ through the inlet openings $c$ into the tower $a$. When the external temperature and the oil to be treated make it necessary, the air is cooled in the cooling device by means of a known cooling medium which enters the cooler through conduit $k$ and leaves it through conduit $k'$. The air leaves the tower $a$ through the chimney $b$.

The following examples are intended to illustrate but not to limit the invention:

EXAMPLE 1

An oil with a paraffin wax content of 20 percent by weight was treated according to the present process with dichlorethane and methylene chloride (mixture ratio 1:1) in order to obtain oil of low pour point and paraffin wax containing little oil.

*Stage 1*

The oil was heated to 40° C. and sprayed into the tower $a$. During the spraying, air was drawn in from the exterior by means of the blower $h$ by way of conduit $m$ and conducted under pressure towards the condenser $p$ where its temperature was reduced from 25° C. to 15° C. From the condenser $p$ onwards the cooled air was passed through opening $c$ in the tower $a$ and from there through the chimney $b$ into the open air.

The sprayed mass fell upon the base plate $d$ which was cooled to —20° C.

By means of a scraper $f$ the sprayed mass was conveyed into a container through the outlet $e$ where it was mixed at —20° C. with about 300 volumes percent of dichlorethane-methylene chloride and the whole stirred for about 30 minutes. The mixture was then filtered in a sieve centrifuge and the filtrate consisting of the majority of the oil to be separated was freed from solvent. By this means 69 percent of oil was obtained. This oil had a pour point of —22° C.

*Stage 2*

The paraffin wax from Stage 1 was stirred with 100 volumes percent of solvent, calculated upon the original oil, stirred at 10° C. and again centrifuged.

*Stage 3*

The residue from Stage 2, that is to say the paraffin wax cake, was washed with fresh solvent in the centrifuge. Thereupon the solvent was removed and a paraffin wax was obtained with a setting point of 53° C. with an oil content of 2 percent.

The collected wash filtrates from Stages 2 and 3 were likewise freed from solvent and a further 9.5 percent of oil was obtained of pour point —19° C.

EXAMPLE 2

In a continuous working operation, the same oil as in Example 1 was treated in a manner following the same principle. The only distinction consisted in that the granular mass obtained in Stage 1 by the spraying operation was not digested or stirred with pure solvent but with the filtrate of Stage 2 of an earlier process.

Moreover the crude paraffin wax in Stage 2 was not taken up with pure solvent but with wash filtrate from Stage 3. The filtrates are thus completely returned to the process. In this method of working already in Stage 1 78.5 percent of dewaxed oil of pour point −19° C. to −22° C. was obtained. The quantity and quality of the paraffin wax were the same as in Example 1.

EXAMPLE 3

A crude paraffin wax with an oil content of 7 percent by weight and a setting point of +42° C. was treated with a mixture of methylene chloride and dichlorethane (mixture ratio 1:1), according to the present process in order to remove oil and to produce hard paraffin wax.

The liquid crude paraffin wax was sprayed at 45° C. into the tower *a* in which the base plate was cooled to +10° C. The air was similarly cooled to a temperature of +15° C.

The granular mass produced by spraying was mixed at +10° C. with 150 volumes percent of solvent. This solvent contained a certain quantity of oil. After the mass had been stirred for about 30 minutes it was filtered. The filtrate produced contained the major quantity of the oil to be removed; it was freed from solvent. The paraffin wax was after-washed with pure solvent and the wash filtrate obtained was utilised in a further stage of the process in order to digest the crude paraffin after the spraying operation. The paraffin wax from the first stage was again taken up with solvent and again washed, this time at 30° C. The wash filtrate served in a further stage of the process in order to subject the paraffin wax from the first stage to a further treatment.

The after-washed paraffin wax obtained in the second stage was freed from solvent. The final product consisted of hard paraffin wax with a melting point of 52° C.; it contained only about 0.2 percent by weight of oil.

We claim:

1. A process for separating wax from a wax-containing oil, which comprises spraying the liquid wax-containing oil at a temperature of approximately 40° C. in a finely divided state into a tower through which air at approximately atmospheric temperature and at least 10° C. below the pour point of the oil is passed in countercurrent to the finely divided particles of the sprayed mixture, whereby a solid granular mass is collected on the floor of the tower which floor is cooled to a temperature of −20° C., subsequently mixing and stirring said mass at −20° C. with 300% by volume of a mixture of dichlorethane and methylene chloride, separating the wax from the oil solution by filtration, mixing the wax with 100% by volume of a mixture of dichlorethane and methylene chloride, filtering the resulting solution to separate wax from the oil, washing the filter residue with the solvent consisting of dichlorethane and methylene chloride, and removing the solvent from the wax.

2. A process for separating hard wax from an oil-containing crude wax, which comprises spraying the liquid crude wax at a temperature of approximately 45° C. in a finely divided state into a tower through which air at approximately atmospheric temperature and at least 10° C. below the pour point of the crude wax is passed in countercurrent to the finely divided particles of the sprayed crude wax, whereby a solid granular mass is collected on the floor of the tower which floor is cooled to a temperature of +10° C., subsequently mixing and stirring said mass at +10° C. with 150% by volume of a mixture consisting of dichlorethane and methylene chloride, separating the undissolved wax from the solution of oil and soft wax by filtration, mixing the filter cake with 100% of the solvent consisting of dichlorethane and methylene chloride in order to dissolve out the residual oil and soft wax, separating the hard wax from the solution by filtration, washing the filter cake with solvent, and removing the solvent from the hard wax obtained.

3. Apparatus for use in separating wax from a mixture of oil and wax, which comprises a tower the upper part of which narrows to form a chimney, nozzle means in the upper part of the tower for spraying the oil-wax mixture into air within the tower, air inlets in the lower part of the tower around the periphery thereof for introducing air into the tower in countercurrent to the finely divided particles of the sprayed oil-wax mixture, a floor at the base of the tower for collecting the deposited mixture, said floor having a discharge opening therein for the mixture, a cooling jacket on the underside of the floor having an inlet and outlet for the passage of a cooling fluid through the jacket, and scraping means for removing the mixture deposited on the floor.

4. Apparatus for use in separating wax from a mixture of oil and wax, which comprises a tower the upper part of which narrows to form a chimney, nozzle means in the upper part of the tower for spraying the oil-wax mixture into air within the tower, air inlets in the lower part of the tower around the periphery thereof for introducing air into the tower in countercurrent to the finely divided particles of the sprayed oil-wax mixture, means for the exit of air from the upper part of the tower to atmosphere, a cooling device outside the tower for cooling the air on its way to the tower, a floor at the base of the tower for collecting the deposited mixture, said floor having a discharge opening therein for the mixture, means for cooling the floor to below ambient temperature, and scraping means for removing the mixture deposited on the floor.

References Cited in the file of this patent

UNITED STATES PATENTS

| | | |
|---|---|---|
| 1,277,935 | Hussey | Sept. 3, 1918 |
| 1,762,433 | Trumble | June 10, 1930 |
| 2,116,144 | Dickinson | May 3, 1938 |
| 2,158,370 | Knowles | May 16, 1939 |
| 2,164,773 | Knowles | July 4, 1939 |
| 2,229,658 | Jenkins | Jan. 28, 1941 |
| 2,301,965 | Mauro et al. | Nov. 17, 1942 |
| 2,350,944 | Thornton | June 6, 1944 |
| 2,585,779 | Janecek et al. | Feb. 12, 1952 |
| 2,719,817 | Doorn | Oct. 4, 1955 |